April 23, 1957 J. F. WHITE 2,789,871
BEARING MOUNTING DEVICE
Filed Oct. 29, 1954

INVENTOR.
JOSEPH F. WHITE
BY

United States Patent Office 2,789,871
Patented Apr. 23, 1957

2,789,871

BEARING MOUNTING DEVICE

Joseph F. White, Fairview Park, Ohio

Application October 29, 1954, Serial No. 465,488

9 Claims. (Cl. 308—189)

My invention relates to bearing assemblies and to the mounting therefor.

An object of my invention is the provision of an improved mounting for bearings.

Another object is the provision of an efficient and economical construction of a mounting structure for bearings.

Another object is the provision for mounting roller bearings such as ball bearings to a supporting member.

Another object is the provision for securing a bearing assembly to an overhead supporting member in such manner that the axis of the bearing assembly is maintained in proper alignment.

Another object is the provision of a construction in an arrangement for mounting a bearing assembly in such manner as to firmly secure the bearing assembly to the supporting member.

Another object is the provision for a unique and useful arrangement for holding a bearing assembly having a split and resiliently compressible outer race.

Another object is the provision for combining useful features of a bearing assembly having a split and compressible outer race with the advantages of an eye bolt support.

Another object is the provision of a bearing mounting particularly adapted for providing the pivot supports of such apparatus as playground swings and for other analogous uses.

Other objects and a fuller understanding of this invention may be had by referring to the following description and claims, taken in conjunction with the accompanying drawing, in which:

Figure 1:
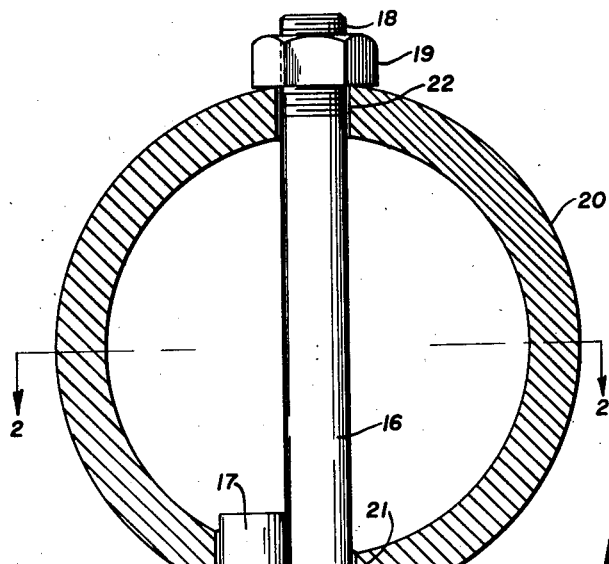
Figure 1 is a side view of my device mounted in a supporting member, with the supporting member shown in cross-section.
Figure 2:
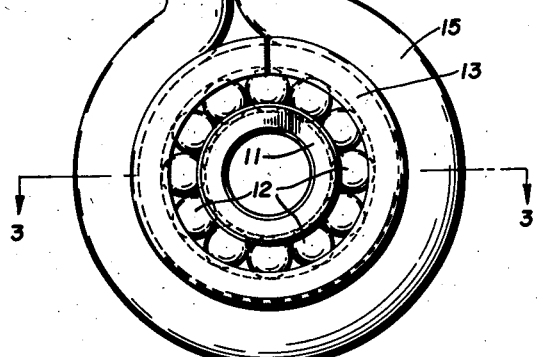
Figure 2 is a cross-sectional view taken through the line 2—2 of Figure 1.

My bearing assembly includes an inner race 11 around which are positioned a plurality of bearings such as balls 12 positioned in a circle as seen in the drawing. Positioned radially outwardly, and spaced from, the inner race 11, is the outer race 13. The outer race 13 is split as seen in Figure 1 and is resiliently compressible. Preferably, it is made of heat treated steel and is formed to have a bias to leave a gap at the split extending radially through the outer race. The outer race is expandable to permit the insertion of balls 12 between the races. Upon the radial inward compression of the outer race 13, the slit is substantially closed to provide a substantially continuous raceway for the balls 12 on the inner surface of the outer race 13.

Figure 3:
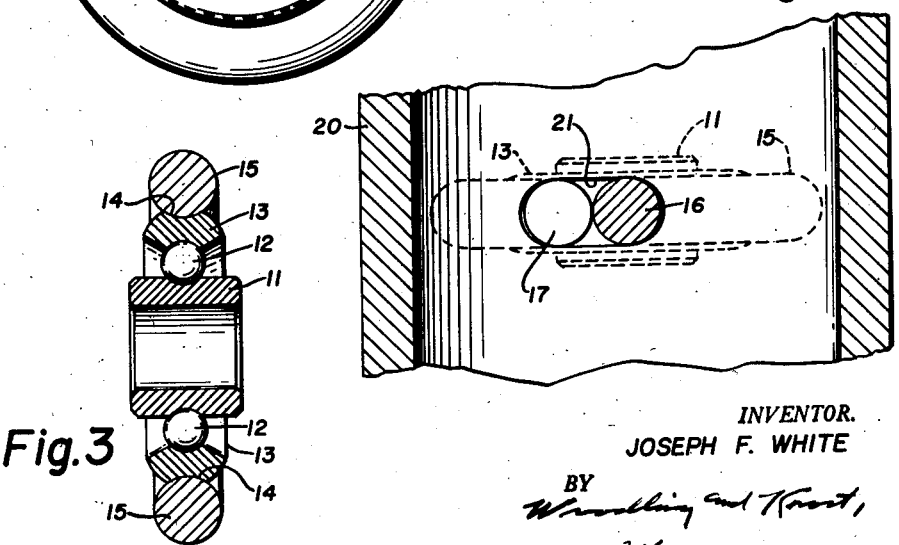
Figure 3 is a cross-sectional view taken through the line 3—3 of Figure 1.

The outer race 13 has a circular groove 14 formed around its outer circumferential wall. This groove 14 is semi-circular in cross-section as seen in Figure 3. The groove 14 runs around the circumferential extent of the outer race 13.

To support the assembly of inner and outer races and balls and to compress the outer race so as to close the slit formed therein, I provide an eye bolt. This eye bolt has a circular or annular head portion 15. Extending radially outward therefrom is a straight shank portion 16. The end of the shank portion 16 is threaded as at 18.

The eye bolt is made of metal, such as iron, and is forged, compressed, or otherwise formed into the contour shown in the drawing. The end of the bolt that was the farthest removed from the threaded end 18 before the forming of the annular portion 15, is designated as the over-lay or short end 17. After the formation of the eye bolt to form the annular head 15, the short end 17 over-lays or lies adjacent to the shank portion 16, the end portion 17 being arranged parallel to the shank portion 16.

Prior to the complete closing of the annular portion 15, that is before the end portion 17 is brought up close against the shank portion 16, the assembly of inner and outer races with the balls in proper position is inserted in the annular space provided in the annular portion 15. Thereafter the annular portion 15 is further formed to complete the circle and thus to bring the end portion 17 up tightly against the shank portion 16 and the eye bolt is set in that position. This causes the compression of the outer race 13, the substantial closing of the slit and hence the confinement of the balls 12 between the inner and outer races.

In the normal set position, the assembly of races and balls is firmly held within the annular space and the rigidity of the material of the eye bolt holds the circle substantially closed, that is, the end portion 17 against the shank portion 16. It will be noted that the annular portion 15 is disposed in the groove 14 while compressing the outer race 13. This interlocks the annular portion 15 to the outer race 13 so as to prevent axial movement of the outer race 13 relative to the annular portion 15 of the eye bolt. Axial thrust may be taken by the bearing assembly and the assembly nevertheless maintained within the annular space of the portion 15 of the eye bolt.

The eye bolt carrying the bearing assembly is mounted to a suitable supporting member such as a pipe 20. For example, the pipe 20 may be the overhead transverse pipe or beam from which playground swings for children are carried. The pipe 20 has a vertically disposed hole bored therethrough for accommodating the shank portion of the eye bolt. At the upper side of the horizontally disposed pipe 20, the hole is circular to form the round opening 22 just large enough to accommodate the round section of the eye bolt. At the bottom portion of the pipe 20 and directly below the round opening 22 is the oval opening 21. The oval opening 21, as seen in the views of the drawing, is non-circular and is large enough to accommodate the shank portion 16 and the end portion 17. The oval opening 21, however, is so dimensioned that there can be no revolving of portions 16 and 17, nor may rotation of the eye bolt upon the axis of the shank portion 16 take place.

The arrangement of the portions 16 and 17 of the eye bolt within the oval opening 21 in the pipe 20 performs two useful functions. One function and purpose of the arrangement is that the bearing assembly cannot be turned so that the axis of the bearing assembly is retained parallel to the axis of the supporting pipe 20. In other words, the disposition of the parts is maintained in that shown in the drawing. The non-circular section of portions 16 and 17 together in the non-circular opening 21 prevents this rotation of the assembly upon the axis of the shank portion 16.

The disposition of the portions 16 and 17 in the opening 21 also provides another function and purpose. Upon downward pull on the bearing assembly, that is by a force downward along the axis of the shank portion, the wall of the opening 21 constrains the end portion 17 from unwrapping; that is, against separation from the shank portion 16. If the end portion 17 were not confined within the opening 21, then a sufficient downward force along the axis of the shank portion 16 might upset or overcome the rigidity of the eye bolt sufficient to allow the circle of the annular portion 15 to partially open, to permit the end portion 17 to move away from the shank portion 16 and to remove the radially inward compression upon the outer race 13. Loss or removal of the inward compression upon the outer race 13 would open the slit in the split outer race and clearly impair the efficiency of the bearing assembly. Also, the enlargement of the annular space within the annular portion 15 would tend to permit the bearing assembly to move out of the confinement of the eye bolt and to thus no longer be held in proper position.

Downward pull upon the eye bolt carrying the bearing assembly is resisted by a nut 19 threadably engaged upon the thread portion 18 of the shank portion 16.

In the use of my mounting such as in a playground swing for children, a swing is carried by two of the bearing assemblies spaced apart along a transverse overhead pipe 20. By the arrangement shown and described, the two pivots of the swing are held in axial alignment and the bearing assemblies are maintained in proper position for accommodating the swinging action of the swing supported thereon. It is understood, of course, that other uses and application may be had and the reference to a playground swing is given by way of example to illustrate some of the useful aspects of the invention.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A bearing device comprising the combination of an inner race, an outer race, said outer race being split and resiliently compressible into circular form, a plurality of bearings positioned between said inner and outer races, and an eye bolt having a head portion defining an annular space, said outer race having a channel formed in its outer peripheral surface, said head portion being disposed in said channel and substantially encircling and embracing said outer race to compress the same, said eye bolt having a shank portion extending from said head portion, said shank portion being adapted to be mounted to a support for the support of the bearing device.

2. A bearing device comprising the combination of an assembly of an inner race, a split resilient outer race and a plurality of bearings therebetween, said outer race having a groove on its outer peripheral surface, and a mounting member, said mounting member having a first portion disposed around said outer peripheral surface of the outer race and concentric therewith to compress said outer race and positioned in said groove to resist axial movement of the outer race relative to said first portion, said mounting member having a shank portion extending radially outward from said first portion and an overlay portion extending from said first portion and disposed adjacent said shank portion, said shank portion and over-lay portion being adapted to be accommodated in a non-circular opening of a supporting member to prevent turning of the mounting member upon securing of the shank portion to a said supporting member.

3. The combination of an inner race, an outer race, bearings between said races, and a supporting member, said outer race being split and resiliently compressible and having a circular channel formed in its outer wall and concentric with the outer race, said supporting member comprising an eye bolt having a substantially circular head disposed in said channel substantially about said outer race and compressing said outer race, the disposition of said circular head in said channel resisting axial movement of the outer race relative to said circular head, said eye bolt having a threaded shank portion extending radially outward from said circular portion, said threaded shank portion being adapted to mount the eye bolt to a supporting member.

4. The combination of an inner race, an outer race, bearings positioned in a circle between the races, and a supporting member, said outer race being split and resiliently compressible, said outer race having a groove extending around its outer circumferential wall, said groove being concentric with the said circle of bearings, said supporting member comprising an eye bolt having a circular head and a threaded shank, said circular head substantially encircling said outer race to compress the outer race and being substantially disposed in said groove to hold the outer race against axial movement relative to the eye bolt, said threaded shank being adapted to be mounted in the opening of a supporting member for the support of the eye bolt and the inner race, outer race and bearings carried thereby.

5. A device comprising the combination of an inner race, an outer race, a plurality of bearings positioned in a circle between said inner and outer races, and an eye bolt, said outer race having at its axial ends portions extending radially outward beyond the outer wall of the outer race intermediate of said axial ends, said eye bolt having a threaded shank, an annular head portion and an over-lay portion extending radially outward of the head portion adjacent and parallel to the shank portion, said annular head portion accommodating said outer race and compressing the same and being interposed between said axial ends of the outer race to resist axial movement of said outer race, said shank portion being adapted to be positioned in the opening of a supporting member carrying the eye bolt, said shank portion and over-lay portion together having a non-circular cross-section to provide for non-rotation of the shank portion relative to the supporting member upon insertion of the shank portion and over-lay portion together in a non-circular opening in said supporting member.

6. The combination of a bearing assembly of inner an outer races and bearings therebetween and an eye-bolt encircling the outer race, said eye bolt tightly embracing said outer-race and holding it against axial movement, said eye bolt having a shank portion adapted to be mounted to a supporting member and an end portion over-laying said shank portion, said shank portion and end portion together being positionable in a non-circular opening in said supporting member, the defining walls of said non-circular opening being arranged to prevent rotation of said shank portion along its axis relative to said supporting member.

7. The combination of an inner race, a split and resiliently compressible outer race, bearings positioned between said races, and an eye bolt, said eye bolt having an annular head embracing and compressing said outer race, said outer race having an outer wall engaging said eye bolt at opposite axial sides thereof to limit axial movement of the outer race relative to the said annular head, said eye bolt having a threaded shank portion extending from the annular head and adapted to be mounted to a supporting member, said eye bolt having an end portion extending from the annular head and disposed adjacent and parallel to said shank portion, said adjacent shank portion and end portion together being positionable in a non-circular opening in said supporting member, said opening having defining walls constraining said shank portion and end portion against separation and restricting rotative movement of the eye bolt around the axis of the said shank portion.

8. The combination of a bearing assembly having an annular groove in an outer circumferential wall thereof, an eye bolt embracing and carrying the said assembly, and a supporting member for supporting the eye bolt and assembly, said supporting member having an opening extending therethrough, the opening having at least one non-circular portion, said eye bolt having a shank portion extending through said opening and adapted to engage said supporting member, said eye bolt having an annular portion disposed around said bearing assembly in said groove to embrace and hold said bearing assembly against axial movement, said eye bolt having an over-lay portion disposed adjacent said shank portion and together defining a non-circular section, said shank portion and over-lay portion being inserted in said non-circular portion of the opening, the walls of said non-circular portion of the opening holding said shank portion and over-lay portion against separation and against rotation of the axis of said shank portion.

9. The combination of an inner race, a split and resiliently compressible outer race, a plurality of bearings positioned between the races, said outer race having a circular groove extending around its outer circumferential wall, and a bolt, said bolt having an eye portion embracing and compressing said outer race, a shank portion extending radially outward from said eye portion, and an end portion over-laying said shank portion adjacent said eye portion, said shank portion being adapted to be inserted in the opening of a supporting member and to be carried by a said supporting member, said end portion together with said shank portion being also adapted to be inserted in said opening to be confined by the defining wall of said opening.

References Cited in the file of this patent

UNITED STATES PATENTS

| 1,177,573 | Pedlow | Mar. 28, 1916 |
| 1,228,490 | Slasor | June 15, 1917 |
| 1,702,574 | Roberts | Feb. 19, 1929 |
| 2,625,449 | Sutowski | Jan. 13, 1953 |

FOREIGN PATENTS

| 501,384 | France | Jan. 23, 1920 |